US011699279B1

(12) United States Patent
Ruepp et al.

(10) Patent No.: US 11,699,279 B1
(45) Date of Patent: Jul. 11, 2023

(54) METHOD AND DEVICE FOR HEADING ESTIMATION

(71) Applicant: Apple Inc., Cupertino, CA (US)

(72) Inventors: Oliver Thomas Ruepp, Baierbrunn (DK); Jai Prakash, Cupertino, CA (US); Johan Hedborg, Sunnyvale, CA (US); Rahul Raguram, San Carlos, CA (US); Michele Stoppa, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/909,014

(22) Filed: Jun. 23, 2020

Related U.S. Application Data

(60) Provisional application No. 62/868,213, filed on Jun. 28, 2019.

(51) Int. Cl.
| | |
|---|---|
| *G06K 9/00* | (2022.01) |
| *G06V 10/44* | (2022.01) |
| *G01C 21/30* | (2006.01) |
| *G06V 20/10* | (2022.01) |
| *G01C 21/08* | (2006.01) |

(52) U.S. Cl.
CPC ............ *G06V 10/44* (2022.01); *G01C 21/30* (2013.01); *G06V 20/10* (2022.01); *G01C 21/08* (2013.01)

(58) Field of Classification Search
None
See application file for complete search history.

(56) References Cited

U.S. PATENT DOCUMENTS

| | | | |
|---|---|---|---|
| 9,135,705 B2 | 9/2015 | Chao et al. | |
| 9,222,783 B2 | 12/2015 | Kansal et al. | |
| 9,652,896 B1 | 5/2017 | Jurgenson et al. | |
| 2009/0228204 A1 | 9/2009 | Zavoli et al. | |
| 2013/0194259 A1* | 8/2013 | Bennett | G06T 19/006 345/420 |
| 2013/0245932 A1* | 9/2013 | Beaurepaire | G01C 21/3667 701/409 |
| 2014/0198227 A1* | 7/2014 | Mohammad Mirzaei | G06K 9/3208 348/208.2 |
| 2015/0178926 A1* | 6/2015 | Jones | G06T 17/05 345/440 |
| 2015/0269436 A1* | 9/2015 | Kim | G06K 9/00624 382/103 |
| 2015/0317829 A1* | 11/2015 | Carter | G06T 19/006 345/633 |
| 2017/0228878 A1 | 8/2017 | Goldman et al. | |
| 2018/0150892 A1* | 5/2018 | Waldron | H04L 67/306 |
| 2019/0019329 A1* | 1/2019 | Eyler | G06F 3/011 |
| 2019/0220088 A1* | 7/2019 | Ishii | G06F 1/1694 |
| 2019/0392212 A1* | 12/2019 | Sawhney | G06K 9/00201 |
| 2020/0200905 A1* | 6/2020 | Lee | G06N 7/005 |

\* cited by examiner

*Primary Examiner* — Oneal R Mistry

(74) *Attorney, Agent, or Firm* — Fernando & Partners, LLP

(57) ABSTRACT

In one implementation, a method of estimating the heading of a device is performed by the device including a processor, non-transitory memory, and an image sensor. The method includes determining a geographic location of the device. The method includes capturing, using the image sensor, an image at the geographic location. The method includes detecting one or more lines within the image. The method includes determining a heading of the device based on the one or more lines and the geographic location.

14 Claims, 11 Drawing Sheets

400

At a device including one or more processors, non-transitory memory, and an image sensor:
Determining a geographic location of the device ⎯410

Capturing, using the image sensor, an image at the geographic location ⎯420

Detecting one or more lines within the image ⎯430

Determining a heading of the device based on the one or more lines and the geographic location ⎯440

Figure 4

METHOD AND DEVICE FOR HEADING ESTIMATION

CROSS-REFERENCE TO RELATED APPLICATIONS

This application claims priority to U.S. Provisional Patent App. No. 62/868,213, filed on Jun. 28, 2019, which is hereby incorporated by reference in its entirety.

TECHNICAL FIELD

The present disclosure generally relates to computer-generated reality environments and, in particular, to systems, methods, and devices for estimating a heading in a computer-generated reality environment.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a CGR environment presented by a device is dependent on the location and orientation of the device in the physical environment, e.g., the real world. In various implementations, GPS-based localization and magnetometer-based orientation provides insufficient accuracy for all use cases. Accordingly, more accurate methods and devices for determining the location and orientation of a device may be desirable.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of a method of estimating the heading of a device in accordance with some implementations.

Figure 1A:
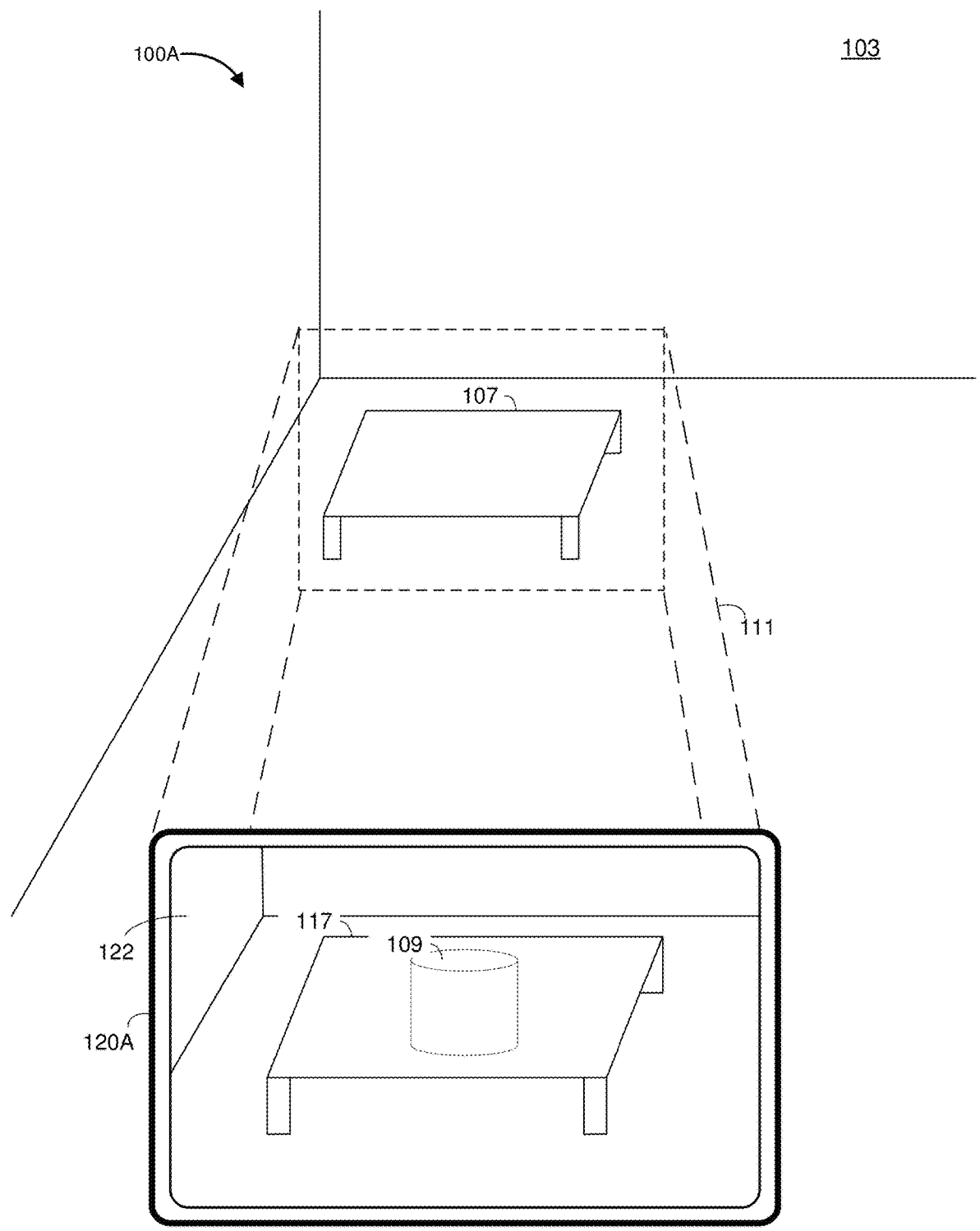
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining an orientation of a device. In various implementations, a method is performed by a device including a processor, non-transitory memory, and an image sensor. The method includes determining a geographic location of the device. The method includes capturing, using the image sensor, an image of the scene. The method includes detecting one or more lines within the image of the scene. The method includes determining an orientation of the device based on the one or more lines and the geographic location.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, determining the pose (e.g., location and orientation) of a device in the real world using a GPS-based system and a magnetometer-based system may not be accurate enough for CGR applications. Accordingly, in various implementations, the accuracy in estimating the pose of a device is enhanced using computer vision algorithms, in particular, image processing methods that include the detection of lines in an image of the scene.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120A.

In some implementations, the electronic device 120A is configured to present CGR content to a user. In some implementations, the electronic device 120A includes a suitable combination of software, firmware, and/or hardware. According to some implementations, the electronic device 120A presents, via a display 122, CGR content to the user while the user is physically present within a physical environment 103 that includes a table 107 within the field-of-view 111 of the electronic device 120A. As such, in some implementations, the user holds the electronic device 120A in his/her hand(s). In some implementations, while providing augmented reality (AR) content, the electronic device 120A is configured to display an AR object (e.g., an AR cylinder 109) and to enable video pass-through of the physical environment 103 (e.g., including a representation 117 of the table 107) on a display 122.

Figure 1B:
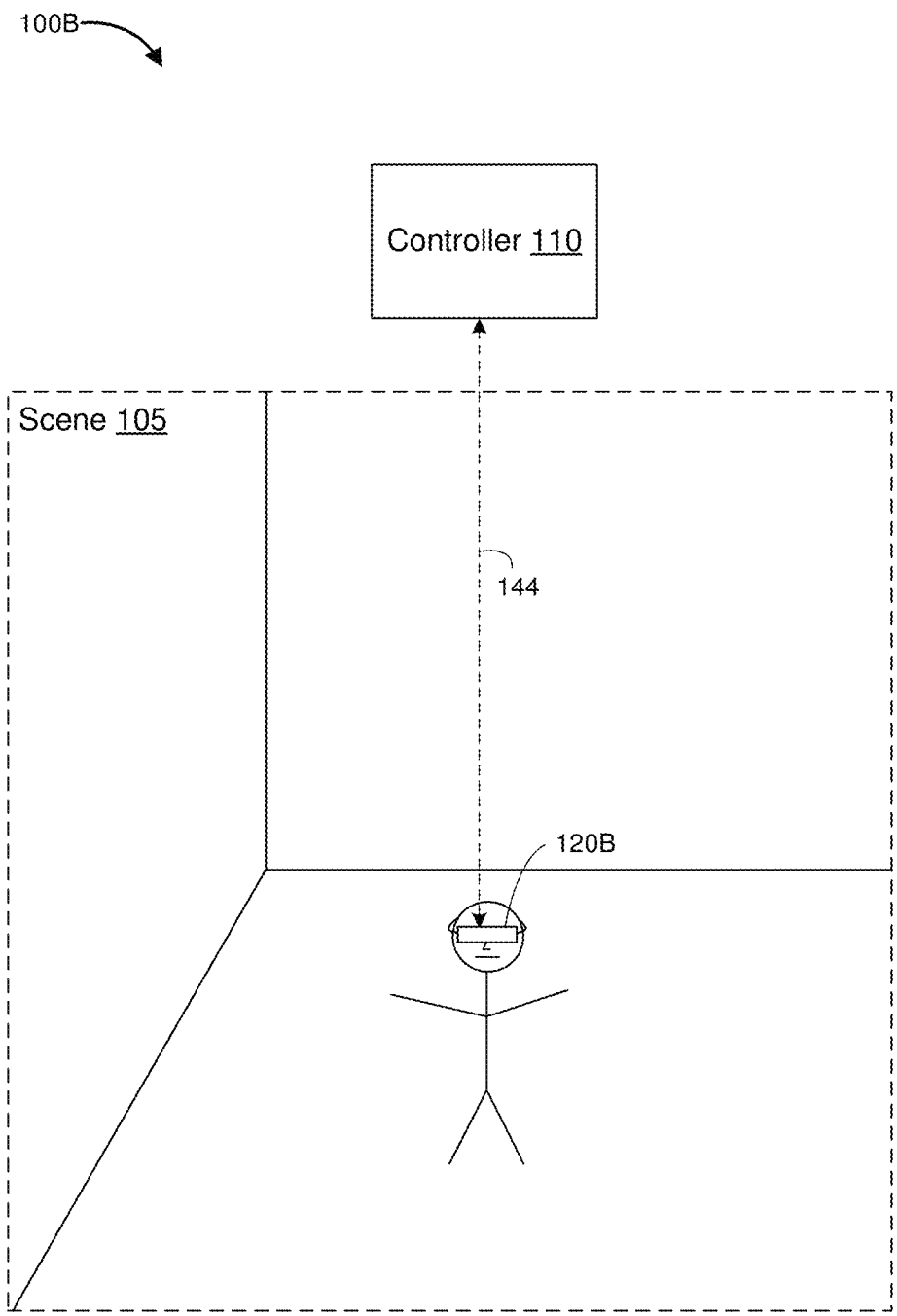
FIG. 1B is a block diagram of an example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100B includes a controller 110 and a head-mounted device (HMD) 120B.

In some implementations, the controller 110 is configured to manage and coordinate presentation of CGR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120B via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120B.

In some implementations, the HMD 120B is configured to present the CGR content to the user. In some implementations, the HMD 120B includes a suitable combination of software, firmware, and/or hardware. The HMD 120B is described in greater detail below with respect to FIG. 3. In some implementations, the functionalities of the controller 110 are provided by and/or combined with the HMD 120B.

According to some implementations, the HMD 120B presents CGR content to the user while the user is virtually and/or physically present within the scene 105.

In some implementations, the user wears the HMD 120B on his/her head. As such, the HMD 120B includes one or more CGR displays provided to display CGR content. For example, in various implementations, the HMD 120B encloses the field-of-view of the user. In some implementations, such as in FIG. 1A, the HMD 120B is replaced with a handheld device (such as a smartphone or tablet) configured to present CGR content, and rather than wearing the HMD 120B the user holds the device with a display directed towards the field-of-view of the user and a camera directed towards the scene 105. In some implementations, the handheld device can be placed within an enclosure that can be worn on the head of the user. In some implementations, the HMD 120B is replaced with a CGR chamber, enclosure, or room configured to present CGR content in which the user does not wear or hold the HMD 120B.

Figure 2:
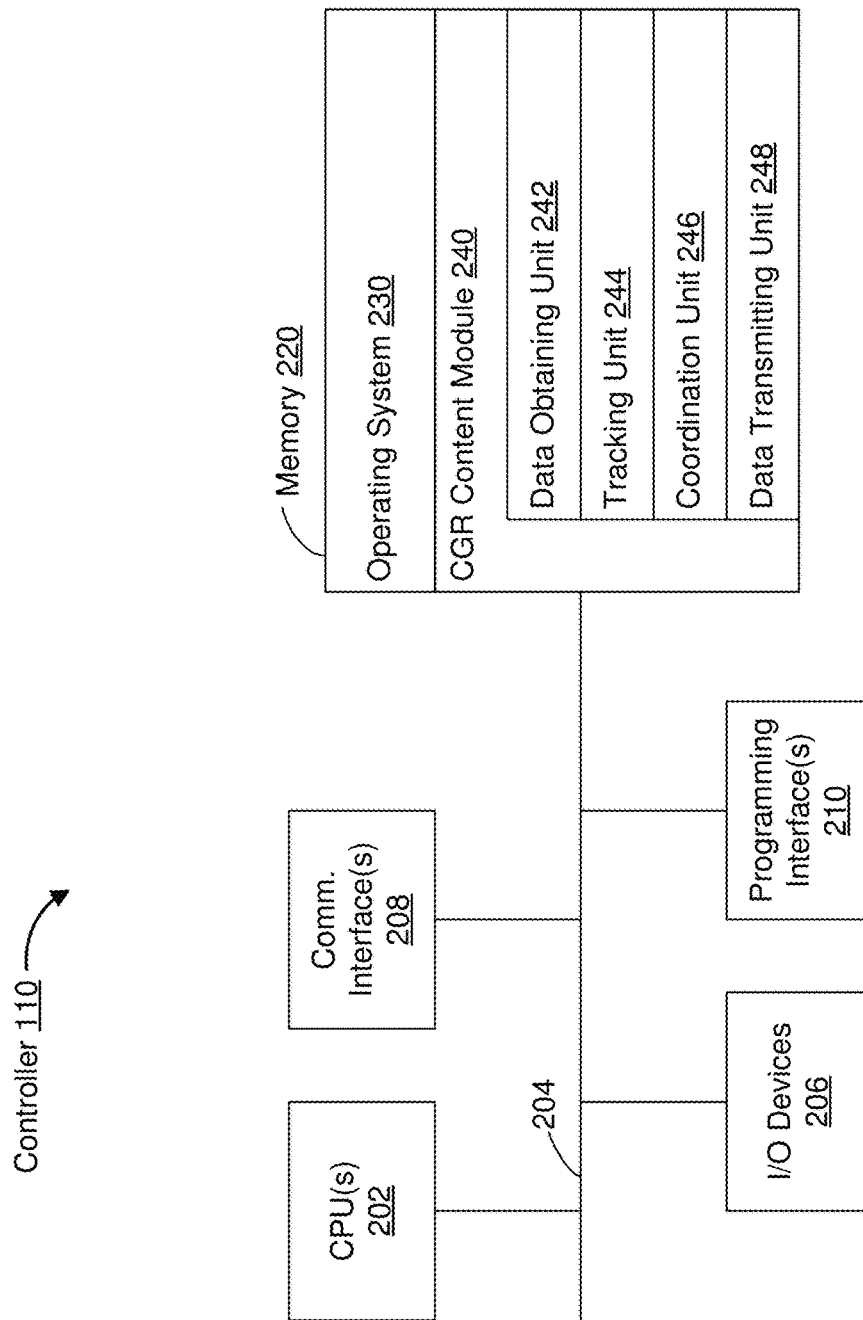
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR content module 240.

The operating system 230 includes procedures for handling various basic system services and for performing hardware dependent tasks. In some implementations, the CGR content module 240 is configured to manage and coordinate presentation of CGR content for one or more users (e.g., a single set of CGR content for one or more users, or multiple sets of CGR content for respective groups of one or more users). To that end, in various implementations, the CGR content module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120B of FIG. 1B. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120B with respect to the scene 105 of FIG. 1B. To that end, in various implementations, the tracking unit 244 includes instructions and/or logic therefor, and heuristics and metadata therefor.

In some implementations, the coordination unit 246 is configured to manage and coordinate the presentation of CGR content to the user by the HMD 120B. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120B. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
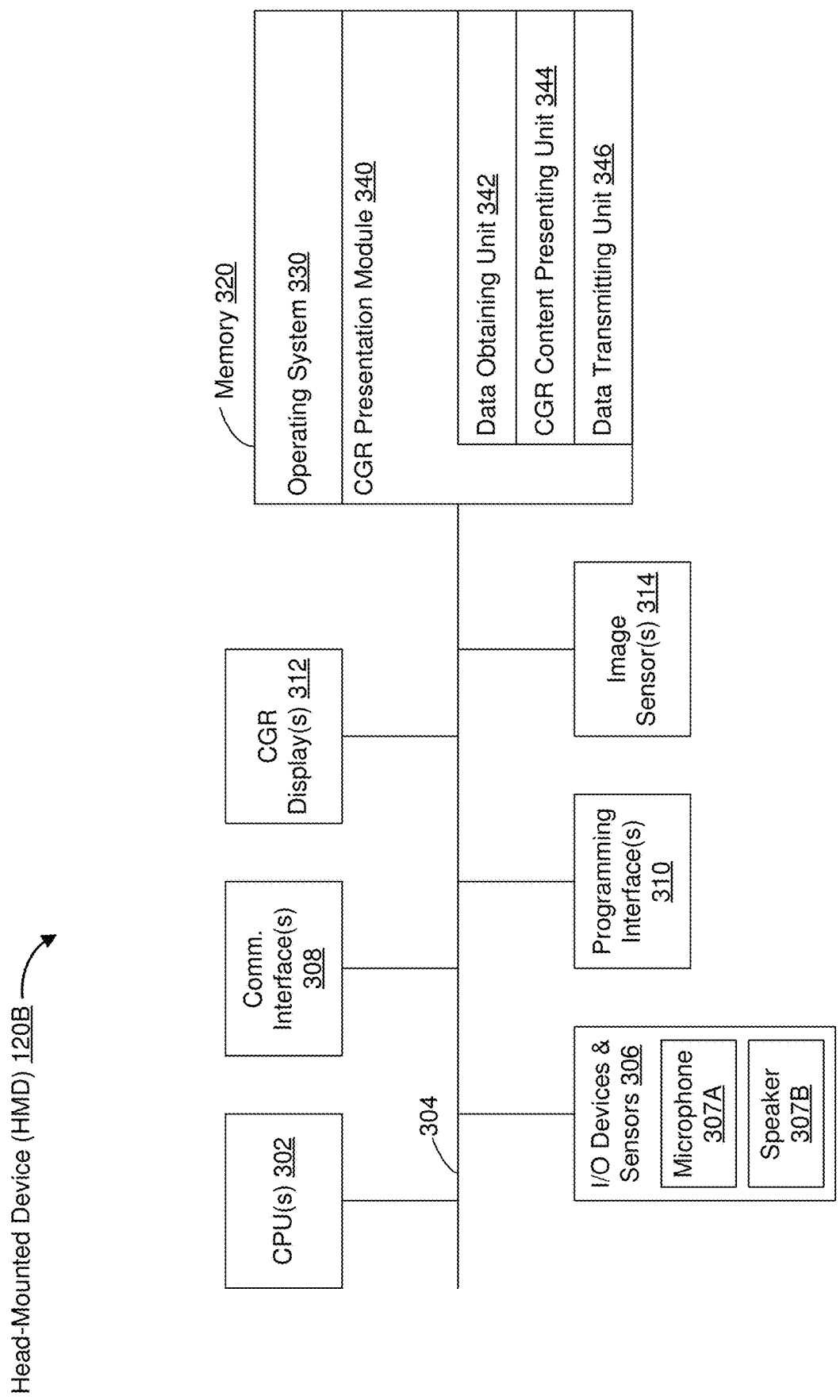
FIG. 3 is a block diagram of an example head-mounted device (HMD) in accordance with some implementations.

FIG. 3 is a block diagram of an example of the HMD 120B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to display CGR content to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120B includes a single CGR display. In another example, the HMD 120B includes a CGR display for each eye of the user. In some implementations, the one or more CGR displays 312 are capable of presenting MR and VR content. In some implementations, the one or more CGR displays 312 are capable of presenting MR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120B was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312 and/or the I/O devices and sensors 306 (such as the one or more speakers 307B). To that end, in various implementations, the CGR presentation module 340 includes a data obtaining unit 342, a CGR content presenting unit 344, and a data transmitting unit 346.

In some implementations, the data obtaining unit 342 is configured to obtain data (e.g., presentation data, interaction data, sensor data, location data, etc.) from at least the controller 110 of FIG. 1. In various implementations, the data obtaining unit obtains a CGR file. To that end, in various implementations, the data obtaining unit 342 includes instructions and/or logic therefor, and heuristics and metadata therefor.

In some implementations, the CGR content presenting unit 344 is configured to present CGR content to a user. In various implementations, the CGR content presenting unit 344 presents CGR content of the CGR file according to rules set forth in the CGR file. To that end, in various implementations, the CGR content presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the CGR content presenting unit 344, and the data transmitting unit 346 are shown as residing on a single device (e.g., the HMD 120B of FIG. 1B), it should be understood that in other implementations, any combination of the data obtaining unit 342, the CGR content presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

The pose (e.g., location and orientation) of a head-mounted device in an environment can be defined by six values, three values defining the three-dimensional location of the head-mounted device (translation) and three values defining the orientation of the head-mounted device at the three-dimensional location (rotation).

The location of the head-mounted device is defined by three coordinates in a three-dimensional coordinate system. In various implementations, the three-dimensional coordinate system includes three axes: an E-axis that is positive along an East direction, an N-axis that is positive along a North direction, and a U-axis that is positive in an up direction, e.g., in the direction opposite gravity. Thus, in various implementations, the location of the head-mounted device is defined by an E-coordinate, an N-coordinate, and a U-coordinate.

The orientation of the head-mounted device is defined by three angles: a heading (corresponding to rotation about the U-axis) which changes when a user of the head-mounted device turns his or her head to the left or right, a pitch which changes when the user moves his or head to look up or down, and a roll which changes when the user tilts his or her head (e.g., bringing the ear closer or further from the shoulder). Thus, the orientation of the head-mounted device is defined by a heading, a pitch, and a roll.

Accordingly, estimating the pose of the head-mounted device is a 6-dof (degrees of freedom) estimation problem. However, an estimate of a gravity vector (e.g., using an inertial sensor, accelerometer, or visual inertial odometry (VIO)) provides estimates of the pitch and roll, reducing the estimation problem to 4-dof estimation problem. Further, an estimate of location (e.g., from a Global Positioning System (GPS) sensor) provides an estimate of the E-coordinate, N-coordinate, and U-coordinate, reducing the estimation problem to a 1-dof estimation problem in which the heading remains to be estimated.

Described below are various implementations of estimating the heading of a head-mounted device (or other device) using computer vision algorithms, in particular, image processing methods that include the detection of lines in an image of the scene.

FIG. 4 is a flowchart representation of a method 400 of estimating the heading of a device in accordance with some implementations. In various implementations, the method 400 is performed by a device with one or more processors, non-transitory memory, and an image sensor (e.g., the HMD 120B of FIG. 3). In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device determining a geographic location of the device. In various implementations, the device determines an E-coordinate, an N-coordinate, and a U-coordinate in a three-dimensional coordinate system. In various implementations, the device determines the geographic location of the device with a GPS system included in the device.

Figure 5A:
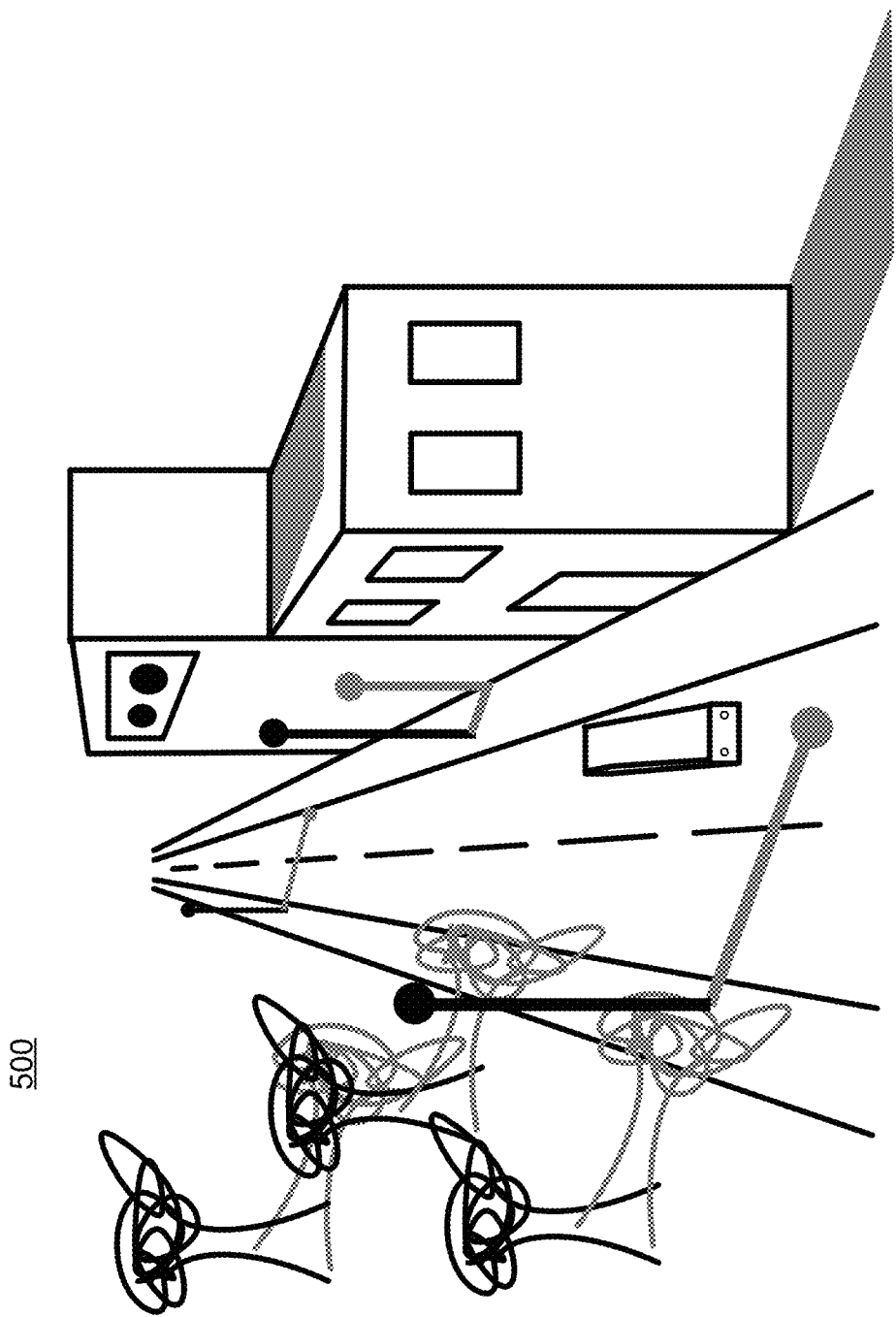
FIG. 5A illustrates an image of a scene captured at a geographic location in accordance with various implementations.

The method 400 continues, at block 420, with the device capturing, using the image sensor, an image at the geographic location. FIG. 5A illustrates an image 500 of a scene captured at a geographic location in accordance with various implementations.

Figure 5B:
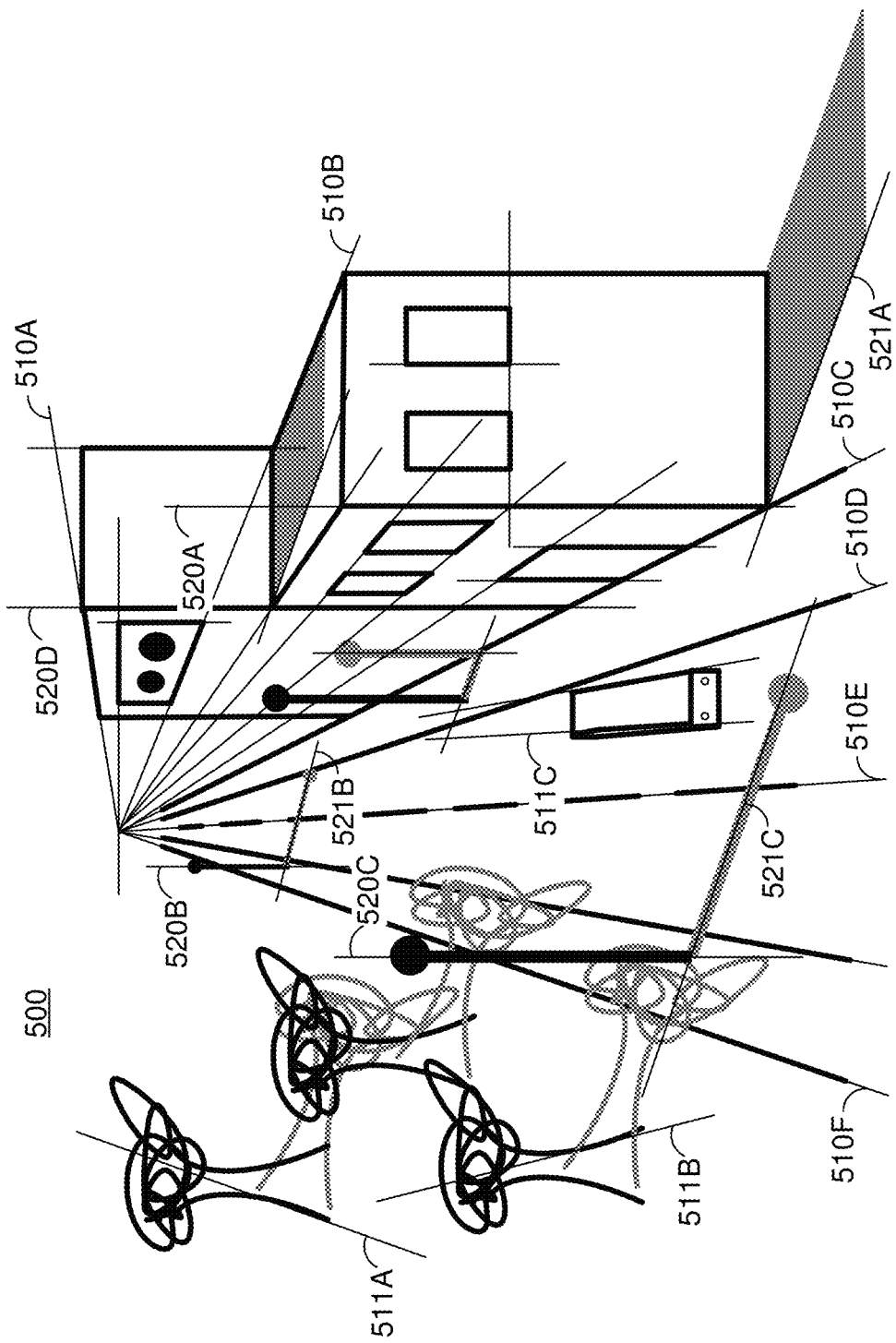
FIG. 5B illustrates the image of the scene with a plurality of detected lines overlaid thereon.

The method 400 continues, at block 430, with the device detecting one or more lines in the image. In various implementations, the lines are detected using standard line detection algorithms FIG. 5B illustrates the image 500 of the scene with a plurality of detected lines 510A-510F, 511A-511C, 520A-520D, and 521A-521C overlaid thereon.

In various implementations, the device categorizes the detected lines in various ways.

In various implementations, the detected lines are categorized as either vertical lines or non-vertical lines. For example, in various implementations, the device estimates a gravity vector using an inertial sensor, accelerometer, or visual inertial odometry (YID). Further, lines that are within a threshold angle of the gravity vector (e.g., less than 5 degrees from the gravity vector) are classified as vertical lines and all other lines are classified as non-vertical lines. Thus, in various implementations, the device classifies the plurality of detected lines 510A-510F, 511A-511C, 520A-520D, and 521A-521C as a set of vertical lines 520A-520D and a set of non-vertical lines 510A-510F, 511A-511C, and 521A-521C.

In various implementations, the detected lines are categorized as vanishing lines (which include a vanishing point) or non-vanishing lines. In various implementations, a voting scheme is used in such a classification. Thus, in various implementations, the device classifies the plurality of detected lines 510A-510F, 511A-511C, 520A-520D, and 521A-521C as a set of vanishing lines 510A-510F and a set of non-vanishing lines 511A-511C, 520A-520D, and 521A-521C.

In various implementations, the detected lines are categorized as aligned lines or non-aligned lines using semantic segmentation. It may be expected that detected lines associated with roads, sidewalks, and buildings are more likely to be aligned in a particular direction (e.g., a road direction determinable using maps data as described below), whereas detected lines associated with other objects, such as trees, cars, or shadows are less likely to be aligned. Thus, in various implementations, the device classifies the plurality of detected lines 510A-510F, 511A-511C, 520A-520D, and 521A-521C as a set of aligned lines 510A-510F and a set of non-aligned lines 511A-511C, 520A-520D, and 521A-521C.

In various implementations, the detected lines are categorized as shadow lines or non-shadow lines. In various implementations, the device categorizes a line as a shadow line based on semantic segmentation. In various implementations, the device categorizes a line as a shadow line when it intersects a corresponding vertical line (e.g., at a particular angle). Thus, in various implementations, the device classifies the plurality of detected lines 510A-510F, 511A-511C, 520A-520D, and 521A-521C as a set of shadow lines 521A-521C (with respective vertical lines 520A-520C) and a set of non-shadow lines 510A-510F, 511A-511C, 520A-520D, The method 400 continues, in block 440, with the device determining a heading of the device based on the one or more lines and the geographic location. As noted above, in various implementations, the device categorizes the detected lines. Further, in various implementations, the device determines the heading of the device based on the one or more detected lines of a particular category, e.g., only aligned lines and vertical lines, only non-vertical lines, or only shadow lines.

In various implementations, the device determines the heading based on the geographic location by determining one or more dominant road directions at the geographic location and determining the heading based on the one or more dominate road directions.

Figure 6A:
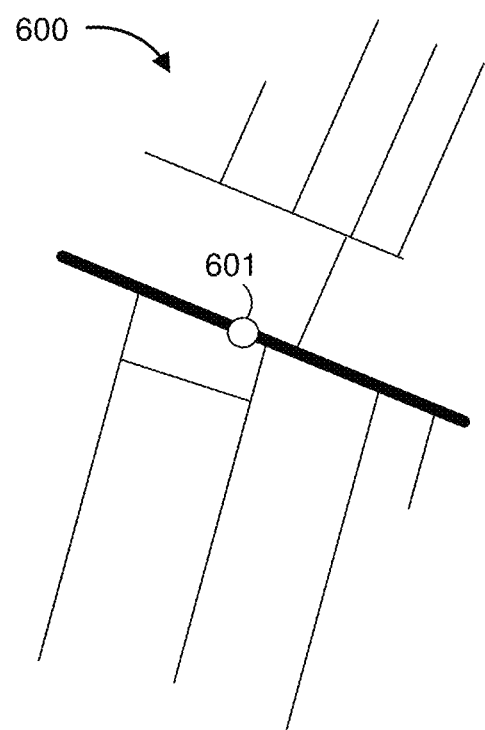
FIG. 6A illustrates map data in an area around a geographic location in accordance with various implementations.

In various implementations, the device obtains map data indicating the locations of roads in an area around the geographic location. FIG. 6A illustrates map data 600 in an area around a geographic location 601 in accordance with various implementations. The map data 600 includes a plurality of road segments corresponding to roads in the area. In various implementations, the area includes roads within 50 meters of the geographic location 601.

In various implementations, the device determines dominant road directions based on the map data.

Figure 6B:
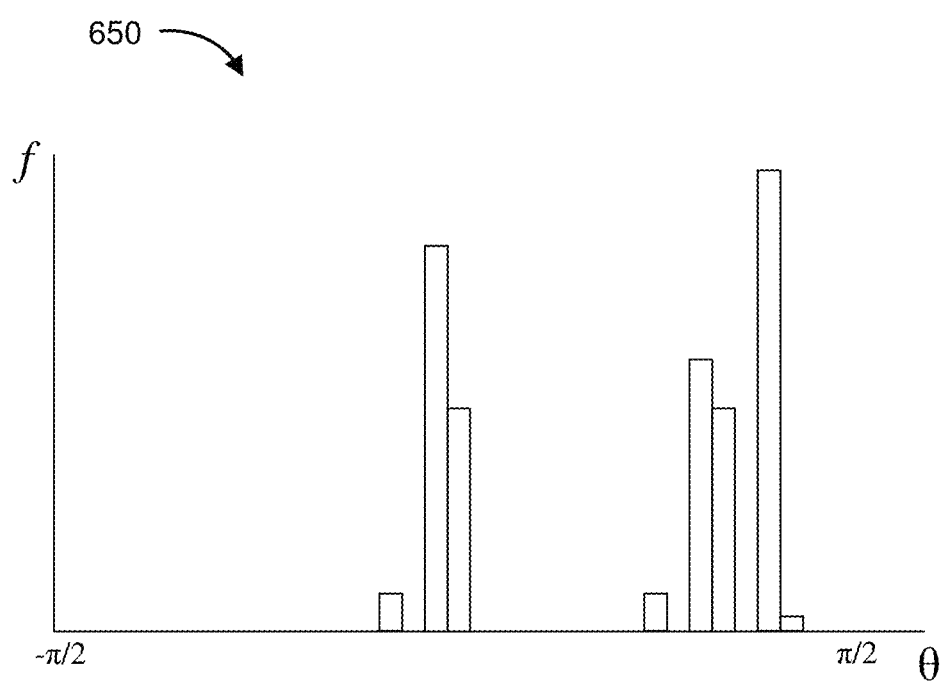
FIG. 6B illustrates a road direction histogram in accordance with various implementations.

In various implementations, the dominant road directions are determined based on a road direction histogram. For example, in various implementations, the direction of each road of the map data is quantized into one of 180 bins between $-\pi/2$ and $\pi/2$, given each bin a quantization error of approximately one degree. A road direction histogram is generated in which each road segment votes in the road direction histogram proportional to the length of the road segment. FIG. 6B illustrates a road direction histogram 650 in accordance with various implementations. The road direction histogram 650 illustrates the frequency (f) of various road directions ($\theta$) between $-\pi n/2$ and $\pi/2$. Each peak in the road direction histogram corresponds to a dominant road direction. Thus, by detecting N peaks in the road direction histogram, N dominant road directions are determined. In various implementations, the histogram is subjected to non-maximal suppression, such as a window-based filtering, in order to detect the peaks (and the corresponding dominant road directions).

In various implementations, the dominant road directions are determined based on a weighted mean shift algorithm. For example, in various implementations, each road segment is initially associated with a value corresponding to the direction of the road segment and a weight corresponding to the length of the road segment. At each iteration of the weighted mean shift algorithm, all road segments having values within a window of width W have their values replaced with a weighted mean. After a few iterations, the top N values are selected as N dominant road directions.

In various implementations, the device determines the heading of the device based on the one or more lines using a probabilistic approach. In particular, the heading of the device ($\psi$) is determined as the most likely candidate heading ($\Psi$) given the one or more lines (L). Accordingly:

$$\psi = argmax_\psi(P(\Psi|L))$$

Applying Bayes theorem, the heading of the device is determined as the candidate heading that maximizes the probability of detecting the one or more lines (L) given that the heading of the device is the candidate heading, weighted by the probability of the heading of the device is the candidate heading:

$$\psi = argmax_\psi(P(L|\Psi)P\Psi)$$

Where V is a vanishing direction in the image, a function of candidate heading (e.g., V=f($\Psi$)), the above equation can be rewritten as:

$$\psi - argmax_\psi \int_V (P(L|V)P(V|\Psi))$$

or $$\psi - argmax_\psi(P(L|f(\Psi))P(\Psi))$$

Using the gravity vector (g) as a vanishing direction and N vanishing directions corresponding to the N dominant road directions at the geographic location gives N+1 vanishing directions. Further, N+2 models for a particular line can be defined based on the N+1 vanishing directions and an additional model that the particular line does not belong to the N+1 vanishing directions. Thus, the models (M) are as follows:

$$M = \begin{cases} m_i = V_i, \forall\ i \in \{1\ \ldots\ N\} \\ m_i = g, i = N+1 \\ m_i = \text{other}, i = N+2 \end{cases}$$

The posterior is sum over all possible model configurations:

$$P(\psi\mid L) = P(\psi)\sum_M P(L\mid M, f(\psi))P(M)$$

Here, the prior probability P(M) does not depend on the candidate heading (wΨ.

Assuming conditional independence of individual lines of the one or more detected lines, $$P(M) = \prod_l P(m_l)$$

Accordingly, $$P(\psi\mid L) = P(\psi)\prod_l \sum_m P(l\mid m, f(\psi))P(m)$$

Using log-likelihood estimation, a cost function (C(Ψ)) is defined as:

$$C(\psi) = \sum_l \log\left(\sum_m P(l\mid m, f(\psi))P(m)\right)$$

In various implementations, the prior probability is modelled as follows, where p is the probability of a line belonging to any vanishing direction:

$$P(m) = \begin{cases} \dfrac{p}{N+1}, i \in \{1\ \ldots\ N, g\} \\ 1-p, i = \text{other} \end{cases}$$

In various implementations, p=0.9. Further, $$P(l\mid m, f(\psi)) = \begin{cases} P_{ang}(\phi_l - \theta(l, m, f(\psi))), i \in \{1\ \ldots\ M, g\} \\ \dfrac{1}{2\pi}, i = \text{other} \end{cases}$$

where $\phi_l$ is the angle of a particular detected line (l) in the image (in an image reference system) and θ(l,m,f(Ψ)) is the angle of a line between the midpoint of the line (l) and projection of the vanishing direction associated with the model onto the image. Further, $P_{ang}$ is a Gaussian with a mean (μ) and standard deviation (σ). In various implementations, σ=1/52. In various implementations, other functions may be used which decrease as the absolute value of the argument increases, such as a Laplace distribution or Cauchy distribution.

Accordingly, the cost function simplifies to:

$$C(\psi) = \sum_l \log\left(\sum_{i=1:N,g} \frac{p}{N+1}\frac{1}{\sqrt{2\pi}\sigma^2}e^{\frac{(d(\phi_l\theta(l,m,f(\psi)))-\mu)^2}{2\sigma^2}} + \frac{1-p}{2\pi}\right)$$

Figure 7:
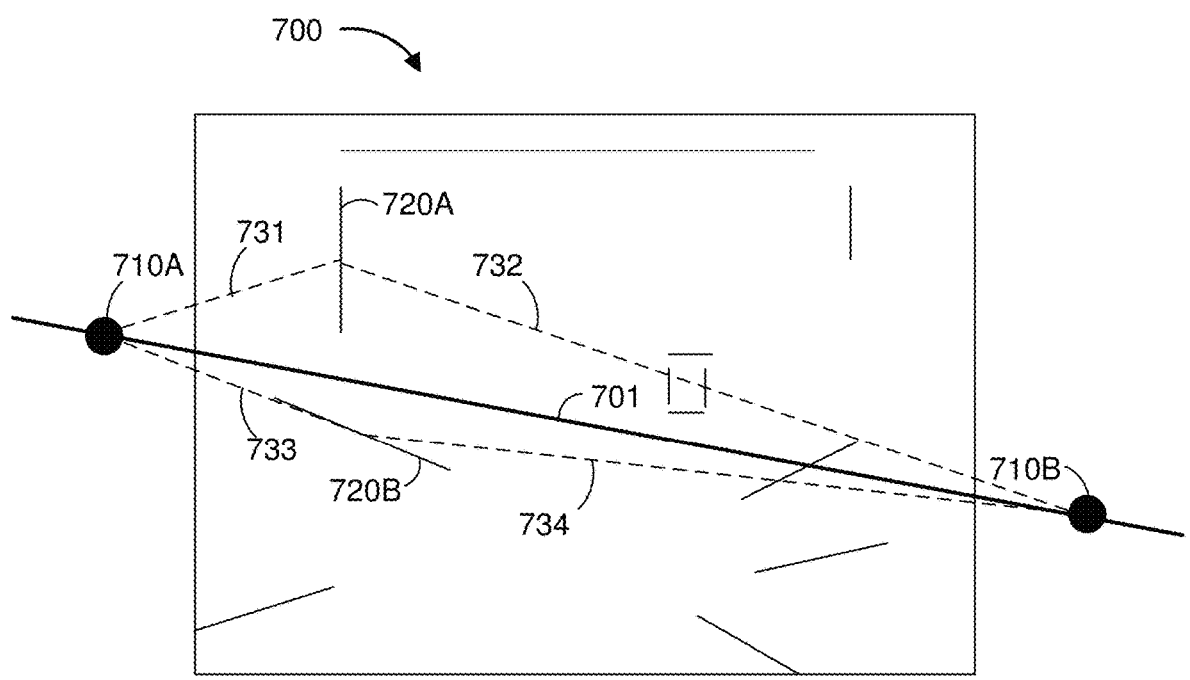
FIG. 7 illustrates a set of detected lines in an image according to various implementations.

FIG. 7 illustrates a set of detected lines in an image 700 according to various implementations. The image 700 includes, among others, a first detected line 720A and a second detected line 720B. FIG. 7 also illustrates a horizon line 701 and a first vanishing point 710A and a second vanishing point 710B on the horizon line 701. The location, in the image reference system, of the first vanishing point 710A and the second vanishing point 710B change as a function of candidate heading.

Accordingly, at a particular candidate heading ($\Psi_1$), the cost function includes a first term based on the difference between the angle ($\phi_1$) of the first line 720A and the angle (θ(1,1,f($\Psi_1$))) of a line 731 passing through the first vanishing point 710A and the midpoint of the first line 720A. Because this difference is large, the contribution to the cost function is small.

The cost function includes a second term based on the difference between the angle ($\phi_1$) of the first line 720A and the angle (θ(1,2,f($\Psi_1$))) of a line 732 passing through the second vanishing point 710B and the midpoint of the first line 720A. Because this difference is large, the contribution to the cost function is small.

The cost function includes a third term based on the difference between the angle ($\phi_2$) of the second line 720B and the angle (θ(2,1,f($\Psi_1$))) of a line 733 passing through the first vanishing point 710A and the midpoint of the second line 720B. Because this difference is small, the contribution to the cost function is large.

The cost function includes a second term based on the difference between the angle ($\phi_2$) of the second line 720B and the angle (θ(2,2,f($\Psi_1$))) of a line 734 passing through the second vanishing point 710B and the midpoint of the second line 720B. Because this difference is large, the contribution to the cost function is small.

Accordingly, in various implementations, the device determines the heading of the device by determining values of a cost function at a plurality of candidate headings, wherein the cost function includes a term based on the difference between the angle of a particular line of the one or more lines and the angle of a line passing through the midpoint of the particular line and a vanishing point based on the candidate heading and a particular dominant road direction of the one or more dominant road directions. In various implementations, the cost function includes a plurality of such terms for a plurality of the one or more lines (e.g., each of the one or more lines) and/or a plurality of the one or more dominant road directions (e.g., each of the one or more dominant road directions).

Basing the difference between the angle of a particular detected line and the angle of the line between its midpoint and a vanishing point on a cosine distance, where $l_1$ and $l_2$ are the endpoints of the particular detected line, then μ=1 and $$d(\phi_l, \theta) = \frac{1}{2}(l_1 - l_2)^T(l_1 + l_2 - R^C_W(\psi)V_i)$$

Basing the difference between the angle of a particular detected line and the angle of the line between its midpoint and a vanishing point on angle directly, then μ=0 and $$d(\phi_l, \theta) = a\cos\left(\frac{1}{2}(l_1 - l_2)^T(l_1 + l_2 - R_W^C(\psi)V_i)\right)$$

In either case, where e is a unit vector to the East, and g is the gravity vector:

$$R_W^C(\psi) = \begin{bmatrix} \cos(\psi) & -\sin(\psi) & 0 \\ \sin(\psi) & \cos(\psi) & 0 \\ 0 & 0 & 1 \end{bmatrix} [e \quad e \times g \quad -g]$$

Figure 8:
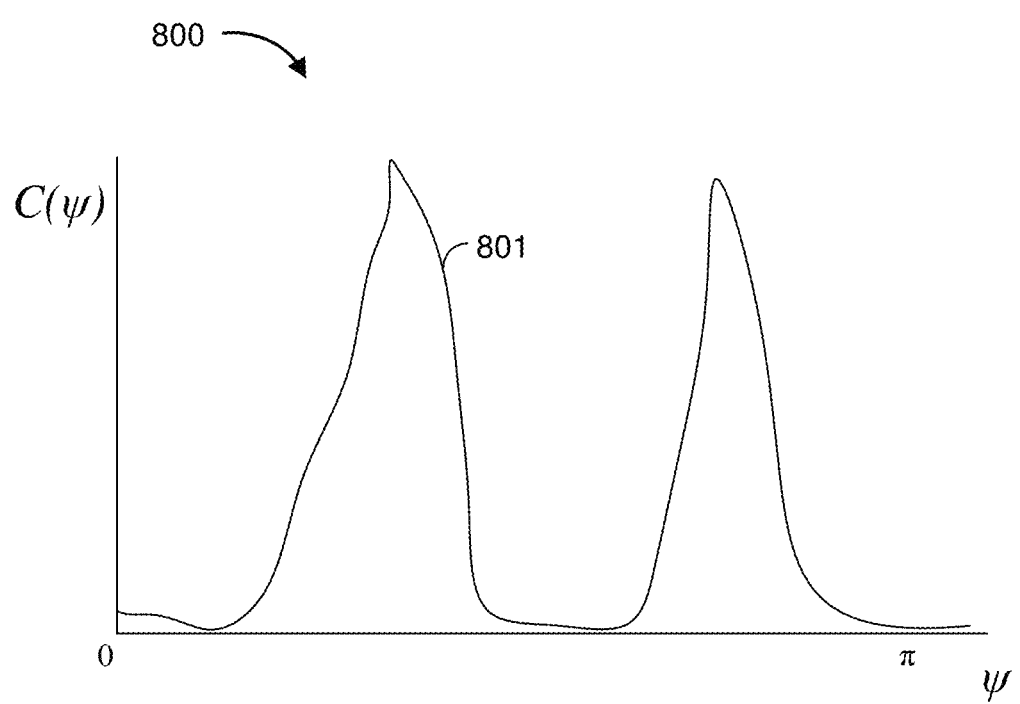
FIG. 8 illustrates a plot of the cost function versus candidate heading in accordance with various implementations.

FIG. 8 illustrates a plot 800 of the cost function versus candidate heading in accordance with various implementations. The peaks of the line 801 represent potential selections for the heading of the device. In various implementations, the device selects the maximum of the line 801 as the heading of the device. In various implementations, the device selects the peak closest to a heading given by a magnetometer-based compass or otherwise uses the heading given by the magnetometer-based compass to resolve ambiguities. In various implementations, the line 801 is differentiable for further non-linear refinement processes.

In various implementations, rather than the cost function including a summation over model, the cost function is determined for each model separately (e.g., C(Ψ, m)) and peaks in this two-dimensional cost function are selected as the heading of the device.

In various implementations, the device determines the heading of the device based on the one or more lines using an inverse probabilistic approach. Rather than comparing vanishing points determined by the dominant road directions to the detected lines, vanishing points are determined based on the one or more detected lines are compared to the dominant road directions. In various implementations, in determining the one or more vanishing points, only non-vertical lines are used. In various implementations, in determining the one or more vanishing points, only vanishing lines are used. In various implementations, in determining the one or more vanishing points, weights are assigned to particular lines based on the length of the line. In various implementations, in determining the one or more vanishing points, weights are assigned to particular lines based on their angle from the horizon (e.g., lines close the horizon are weighted less because noise is amplified).

In various implementations, the device determines the heading of the device based on the one or more lines using an astronomical approach. By detecting the angle of one or more shadow lines, the position of the sun with respect to the device can be determined. Further, incorporating the geographic location of the device (and the current time), the heading of the device can be determined.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, non-transitory memory, and an image sensor:
determining a geographic location of the device;
determining one or more dominant road directions at the geographic location by obtaining map data indicating the location of roads in an area around the geographic location;
determining a plurality of vanishing points corresponding to a plurality of candidate headings and the one or more dominant road directions at the geographic location;
capturing, using the image sensor, an image at the geographic location;
detecting one or more lines within the image; and
determining a heading of the device by selecting one of the plurality of candidate headings based on the one or more lines and the plurality of vanishing points.

2. The method of claim 1, wherein detecting the one or more lines within the image includes categorizing, using a gravity vector, the one or more lines as one or more vertical lines and one or more non-vertical lines and wherein determining the heading of the device is based on the one or more non-vertical lines.

3. The method of claim 1, wherein detecting the one or more lines includes categorizing, using a voting scheme, the one or more lines as one or more vanishing lines and one or more non-vanishing lines and wherein determining the heading of the device is based on the one or more vanishing lines.

4. The method of claim 1, wherein detecting the one or more lines within the image includes categorizing, using semantic segmentation, the one or more lines as one or more aligned lines and one or more non-aligned lines and wherein determining the heading of the device is based on the one or more aligned lines.

5. The method of claim 1, wherein detecting the one or more lines within the image includes categorizing the one or more lines as one or more shadow lines and one or more non-shadow lines and wherein determining the heading of the device is based on the one or more shadow lines.

6. The method of claim 1, wherein determining the heading of the device is based on a cost function at the plurality of candidate headings, wherein the cost function includes a term based on the difference between the angle of a particular line of the one or more lines and the angle of a line passing through the midpoint of the particular line and a vanishing point based on a particular dominant road direction of the one or more dominant road directions.

7. The method of claim 6, wherein determining the heading of the device is further based on a heading given by a magnetometer-based compass of the device.

8. The method of claim 7, wherein determining the heading of the device includes determining one or more potential selections for the heading of the device corresponding to one or more peaks of the cost function and selecting, as the heading of the device, one of the one or more potential selections for the heading of the device based on the heading given by the magnetometer-based compass of the device.

9. A device comprising:
an image sensor;
a non-transitory memory; and
one or more processors to:
determine a geographic location of the device;
determine one or more dominant road directions at the geographic location by obtaining map data indicating the location of roads in an area around the geographic location;
determine a plurality of vanishing points corresponding to a plurality of candidate headings and the one or more dominant road directions at the geographic location;
capture, using the image sensor, an image at the geographic location;
detect one or more lines within the image; and
determine a heading of the device by selecting one of the plurality of candidate headings based on the one or more lines and the plurality of vanishing points.

10. The device of claim 9, wherein the one or more processors are to detect the one or more lines within the image by categorizing, using a gravity vector, the one or more lines as one or more vertical lines and one or more non-vertical lines and the one or more processors are to determine the heading of the device based on the one or more non-vertical lines.

11. The device of claim 9, wherein the one or more processors are to detect the one or more lines by categorizing, using a voting scheme, the one or more lines as one or more vanishing lines and one or more non-vanishing lines and the one or more processors are to determine the heading of the device based on the one or more vanishing lines.

12. The device of claim 9, wherein the one or more processors are to determine the heading of the device further based on a heading given by a magnetometer-based compass of the device.

13. A non-transitory memory storing one or more programs, which, when executed by one or more processors of a device with an image sensor, cause the device to:
determine a geographic location of the device;
determine one or more dominant road directions at the geographic location by obtaining map data indicating the location of roads in an area around the geographic location;
determine a plurality of vanishing points corresponding to a plurality of candidate headings and the one or more dominant road directions at the geographic location;
capture, using the image sensor, an image at the geographic location;
detect one or more lines within the image; and
determine a heading of the device by selecting one of the plurality of candidate headings based on the one or more lines and the plurality of vanishing points.

14. The device of claim 9, wherein the one or more processors are to determine the heading of the device based on a cost function at the plurality of candidate headings, wherein the cost function includes a term based on the difference between the angle of a particular line of the one or more lines and the angle of a line passing through the midpoint of the particular line and a vanishing point based on a particular dominant road direction of the one or more dominant road directions.

* * * * *